Dec. 9, 1952        F. L. LE BUS        2,620,996

CABLE WINDING APPARATUS

Filed Jan. 12, 1951        2 SHEETS—SHEET 1

INVENTOR.
F. L. Le Bus
BY C. M. McKnight
ATTORNEY

Dec. 9, 1952 F. L. LE BUS 2,620,996
CABLE WINDING APPARATUS
Filed Jan. 12, 1951 2 SHEETS—SHEET 2

INVENTOR.
F. L. LeBus
BY C. M. McKnight
ATTORNEY

Patented Dec. 9, 1952

2,620,996

UNITED STATES PATENT OFFICE 2,620,996

CABLE WINDING APPARATUS

Franklyn L. Le Bus, Longview, Tex.

Application January 12, 1951, Serial No. 205,745

8 Claims. (Cl. 242—117)

This invention relates to improvements in hoisting drums or spools for receiving steel cable, rope, electric lines and the like.

It is well known that a cable or the like being wound onto a spool should be wound in a uniform manner to prevent the cable from becoming entangled and damaged. The most common method of controlling the winding of cables is either machining grooves in the outer periphery of the drum core or securing suitable grooved bars on the outer periphery of the drum core. The grooves are usually provided in a continuous helix, in the manner of threads on a bolt, over the entire transverse length of the drum core to guide the first layer of cable onto the drum in a continuous helical path. A suitable guide is placed at one end of the drum core to initiate the second layer of the cable in a reversed helical path.

The first wind in the second layer will be initially forced in a reverse helical angle a short distance to cross over one wind of the cable in the first layer. The first wind of the second layer will then follow the groove between two winds of the first layer in the forward helical path. Subsequently, the first wind of the second layer will cross over another wind of the first layer in a reversed direction before the wind is completed. Each subsequent wind of the second layer will be wound in a similar manner, that is, each wind will cross over two winds of the first layer in two separate reversing movements. It will be readily appreciated that when the cable is wound onto a drum under an extremely high tension, the taught cable will resist all reversing movements during the winding operation, and the greater the number of reversing movements, the more likely it will be that the cable will become chaffed and worn. Also, voids will frequently occur between adjacent winds of the second layer to cause entanglement of the cable during the winding and unwinding of the third and subsequent layers.

The present invention contemplates a novel drum for receiving and dispensing steel cable and the like wherein the cable is wound onto the drum core in a combination helical and parallel path. During each wind, the cable is guided in a helical or oblique path for only a portion of the perimeter of the drum core, and is then guided in a path parallel to the drum flanges for the remainder of the wind. In this manner, each wind of the second and subsequent layers crosses only one wind of the previous layer and then follows a groove provided between two winds of the previous layer. The reversing movements of the cable are thereby reduced to a minimum. In addition, this invention contemplates novel end fillers or guides adjacent the flanges of the drum to locate and direct the cross overs between the successive layers at the desired circumferential position.

An important object of this invention is to provide a novel drum for winding steel cable and the like in a combination helical and parallel path.

Another object of this invention is to materially increase the service life of cable frequently wound and unwound from a drum.

A further object of this invention is to reduce to a minimum the reversing movements of a cable being wound on a drum core.

A still further object of this invention is to provide novel end fillers on a drum for directing the cross-overs between the successive layers of cable at predetermined circumferential positions.

Another object of this invention is to provide means for winding a cable onto a drum without voids between the adjacent winds.

Another object of this invention is to provide an efficient drum having a long service life and which may be economically manufactured.

Other objects and advantages of the invention will be evident from the following detailed description, read in conjunction with the accompanying drawings, which illustrate my invention.

Figure 1:
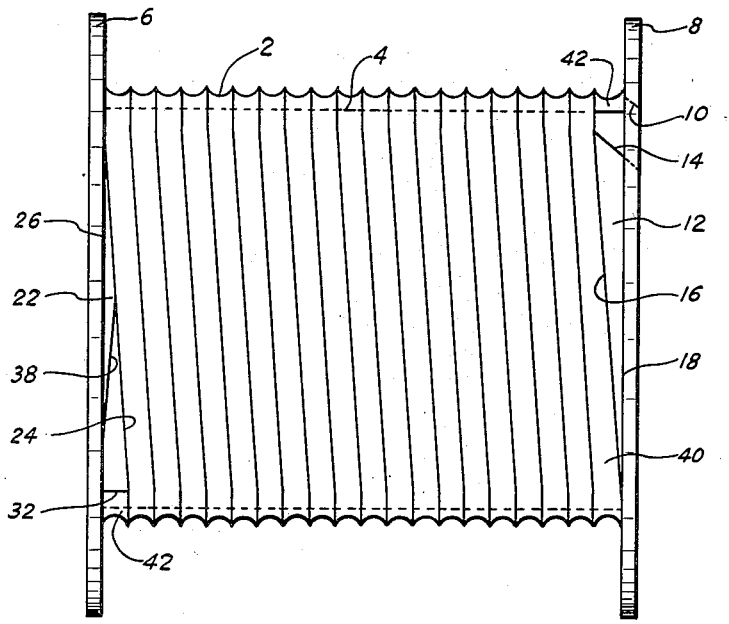
Figure 1 is an elevational view of a novel hoisting drum.

Referring to the drawings in detail, and particularly Fig. 1, reference character 2 designates a hoisting drum, or spool generally comprising a cylindrical core 4 having circular flanges 6 and 8 on the opposite ends thereof. An aperture 10 is provided in the flange 8 to receive the dead or non-working end (not shown) of a cable, rope, or the like (not shown) adapted to be wound on the drum 2.

Figures 2, 3:
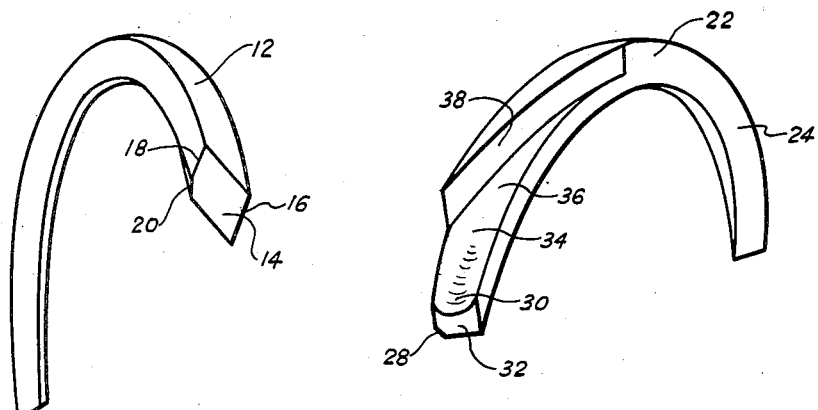
Figure 2 is a perspective view of the starting end filler.
Figure 3 is a perspective view of the opposite end filler.

An arcuately shaped starting end filler 12 (Fig. 2) is secured on the drum core 4 adjacent the flange 8. The large end 14 of the filler 12 is tapered for purposes as will be hereinafter set forth and is placed essentially conterminous with the aperture 10 to assure free access to the aperture 10. The inner face 16 of the filler 12, as clearly shown in Fig. 1, is tapered outwardly from the large end 14 of the filler 12 for purposes as will be hereinafter set forth. The outer face 18 of the filler 12 is straight to abut the inner face of the flange 8, and a small chamfer 20 (Fig. 2) may be provided on the side face 18 adjacent the inner periphery thereof to assure a close fit of the filler 12 to the flange 8, particularly if the flange 8 has been welded (not shown) to the core 4. It will be noted that the filler 12 extends around less than fifty per cent of the circumference of the core 4.

A second arcuate end filler 22 (Figs. 1 and 3) is secured to the core 4 adjacent the flange 6. The end filler 22 is the same length as, and is disposed in alignment with, the starting end filler 12. The inner face 24 of the filler 22 is tapered in a manner similar to the inner face 16 of the filler 12. The outer face 26 of the filler 22 is straight to abut the flange 6 and a small chamfer 28 is provided on the side face 26 adjacent the inner periphery thereof. A groove 30 is provided in a portion of the outer periphery of the filler 22 communicating with the large or wide end 32 thereof. The groove 30 gradually rises to a point of extinction 34 where it communicates with a smooth surface 36 extending over approximately one half the length of the filler 22. A shoulder 38 communicates with the surface 36 and is tapered in a direction opposite to the side face 24 for the purposes as will be hereinafter set forth.

Figure 6:
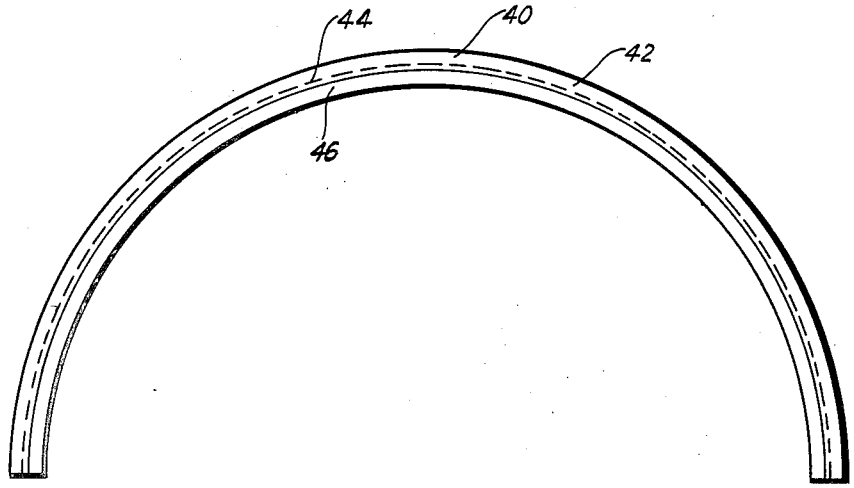
Figure 6 is a typical elevational view of the bars shown in Figs. 4 and 5.
Figure 5:
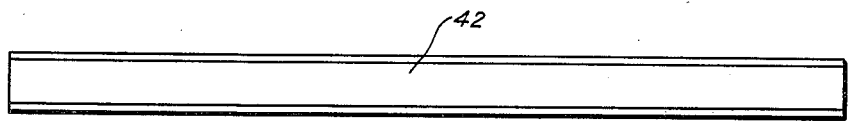
Figure 5 is a plan view of another type of grooved bar used on the drum shown in Fig. 1.
Figure 4:
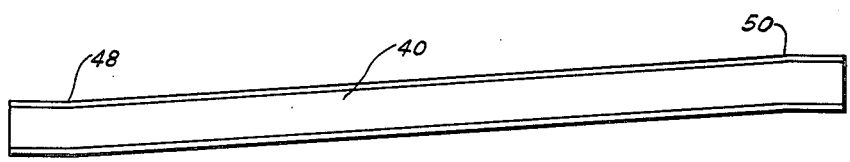
Figure 4 is a plan view of one type of grooved bar used on the drum shown in Fig. 1.
Figure 7:
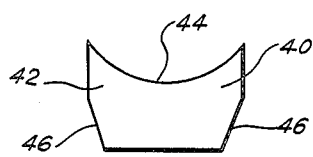
Figure 7 is a typical end view of the grooved bars shown in Figs. 4, 5, and 6.

Two types of grooved bars 40 and 42 (Figs. 4–7) are secured in alternate end to end relationship around the core 4 between the end fillers 12 and 22 to form a continuous groove. Each of the grooved bars 40 and 42 is semicircular, as shown in Fig. 6, and is equal in width to the width of the large ends 14 and 32 of the end fillers 12 and 22 respectively. Furthermore, each of the bars 40 and 42 is provided with a groove 44 in the outer periphery thereof as shown in Fig. 7. Also, a chamfer 46 is provided on each side face of each of the bars 40 and 42 adjacent the inner periphery thereof, to facilitate the welding of the bars to the drum core 4. As clearly shown in Fig. 4, each bar 40 is bent at 48 and 50 to provide an angled portion for the bar equal in length to the length of the end fillers 12 and 22, and conforming to the tapered side faces 16 and 24 of the fillers 12 and 22. The extreme ends of the bars 40 are straight to mate with the ends of the bars 42 as will be more fully hereinafter set forth.

The bars 42 are straight to form the parallel portions of the continuous groove extending from the aperture 10 to the large end 32 of the end filler 22.

*Operation*

When installing the end fillers 12 and 22, and the grooved bars 40 and 42 on the drum 2, the end fillers 12 and 22 are first secured to the drum core 4 adjacent the flanges 6 and 8 in aligned relationship as previously set forth. One of the bars 42 is then secured to the drum core 4 adjacent the flange 8 with one end thereof adjacent the aperture 10 on the side opposite the large end 14 of the filler 12. A bar 40 is then secured to the drum core 4 in end to end relationship with the previously secured bar 42 with the angled portion thereof between the bends 48 and 50 in abutting relation with the tapered side face 16 of the filler 12. The remaining bars 40 and 42 are then placed in alternate end to end relation on the core 4 until one of the bars 42 comes into end to end relation with the large end 32 of the filler 22. In the event the last bar 42 secured to the drum core 4 does not contact the large end 32 of the filler 22, an additional bar 42 may be cut to the desired length and inserted in the remaining space. The groove 44 of the last bar 42 will then communicate with the groove 30 in the end filler 22. As clearly shown in Fig. 1, all of the helical or oblique and parallel portions of the continuous groove will be in the same circumferential position over the entire length of the drum core 4. In the event the length of the drum core 4 does not equal the width of the bars 40 or 42 multiplied by a whole number, suitable spacers (not shown) may be placed between the adjacent sides of the grooved bars to preclude a gap being provided at one end of the drum core 4.

To wind a cable or rope (not shown) onto the drum 2, one end of the cable is secured in the aperture 10, and the remainder of the cable is laid out or held, preferably under tension, in a direction transverse to the longitudinal center line of the drum 2. The drum 2 is then rotated in a counterclockwise direction (referring to the outer face of the flange 8) by suitable machinery (not shown). It will be apparent that as the first layer of the cable is wound onto the drum 2, the cable will follow the continuous groove formed by the bars 40 and 42.

As the first layer is completed, the cable will contact the groove 30 in the large end 32 of the end filler 22 and be raised onto the smooth surface 36. The tapered shoulder 38 will then force the cable in a reverse direction across the last wind in the first layer into the parallel groove between the last and next to last winds of the first layer. It will be noted that the cross over made by the first wind in the second layer will be directly above the angled or helical portion of the last wind in the first layer to confine the angled portions of the layers in a predetermined and confined portion of the circumference of the drum core 4.

During the formation of the second wind in the second layer, the cable will be guided in a reverse direction by the angled portion of the first wind in the same circumferential location. The remaining winds of the second layer will be guided in a manner similar to the second wind until the second layer is completed.

As the last wind of the second layer is completed, the cable will contact the flange 8 and be forced outwardly along the flange 8 to a position on top of the last wind of the second layer to begin the first wind of the third layer. Upon continued rotation of the drum 2, the cable will be guided across the angled portion of the last wind in the second layer in a direction toward the flange 6 and enter the parallel groove between the last two winds of the second layer. The angled portions of the third layer will be formed on top of the angled portions of the second and first layers, permitting the major portion of the cable in the third layer to be wound parallel to the drum flanges 6 and 8 in the parallel grooves formed by the cable in the second layer. It is apparent that subsequent layers placed on the drum 2 will be wound in the same pattern.

The end fillers 12 and 22 obviously determine the length of the angled portions of the bars 40 between the points 48 and 50, which will vary for each size of drum utilized. The percentage of the circumference of the drum core 4 covered by the obliquely disposed grooves may range from one to fifty percent, depending upon the particular application. When the cable is wound parallel to the drum flanges 6 and 8, the cable in the successive layers conforms neatly and efficiently to the grooves between the winds of the previous layers to prevent the cable from becoming entangled and chaffed, therefore, the length of the oblique groove portions are made as short as possible. However, a taut cable, as previously set forth, will resist all reversing movements during the winding thereof, therefore, the oblique grooves must be made of sufficient length to provide practical cross-overs. As a result of experimentation, it is believed the optimum length of the oblique groove portions is approximately twenty to twenty-five percent of the circumferential distance around the drum core 4.

Although the most practical method of grooving the drum core 4 is undoubtedly by the use of the grooved bars 40 and 42, it will be readily understood that the desired grooves may be obtained in several different ways, such as casting or machining (not shown) the drum core 4, or securing a continuous grooved bar (not shown) thereon, for example.

From the foregoing it is apparent that the present invention provides a novel hoisting drum wherein a cable or the like may be wound onto the drum in a combination helical and parallel path to reduce the reversing movements of the cable to a minimum. The greater portion of the cable will be wound parallel to the drum flanges, thereby obtaining a smoothly wound cable without voids between the adjacent winds which may cause entanglement and chaffing of the cable. The service life of the cable and efficiency of the winding operations will be materially increased. It is also apparent that the present invention provides a pair of novel end fillers or guides to locate the cross-overs between the successive layers of cable in predetermined angular positions on the drum core.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a hoisting drum comprising a cylindrical core, flanges at the opposite ends of the core, an arcuate end filler on said core adjacent each of said flanges in aligned relationship, a tapered inner side face on each of said end fillers, a plurality of helically disposed arcuate bars arranged along the drum core between said end fillers, a plurality of arcuate bars disposed in parallel relation with the flanges and in end to end relationship with said first mentioned bars, and a groove in the outer periphery of all of said bars providing a continuous combination helical and parallel groove between said end flanges.

2. In a cable winding apparatus comprising a drum having an essentially cylindrical core with flanges at the opposite ends thereof, means providing a continuous winding groove on the outer periphery of said core between said flanges, portions of said groove being parallel to said flanges, and portions of said groove being at an angle to said flanges.

3. In a cable winding apparatus comprising a drum having an essentially cylindrical core with flanges at the opposite ends thereof, grooved bar means encircling the core between the flanges providing a continuous winding groove, portions of said bar means being disposed parallel to the drum flanges, and portions of said bar means being disposed at an angle to the drum flanges.

4. In a cable winding apparatus comprising a drum having an essentially cylindrical core with flanges at the opposite ends thereof, a continuous groove in the outer periphery of the core encircling the core a plurality of times, the greater portion of each turn of said groove around the core being parallel to the drum flanges, and the remainder of each turn being disposed at an angle to the drum flanges.

5. In a cable winding apparatus comprising a drum having an essentially cylindrical core with flanges at the opposite ends thereof, a tapered end filler at each end of the core in aligned relationship, a plurality of semi-circular shaped bars secured in end to end relation on the drum core, grooves in the outer periphery of said bars providing a continuous winding groove, a plurality of said bars being disposed in line with said fillers and at an angle to the drum flanges, and the remainder of said bars being disposed parallel to the drum flanges.

6. In a cable winding apparatus comprising a drum having an essentially cylindrical core with flanges at the opposite ends thereof, tapered end fillers at the opposite ends of the drum core to initiate the cross-overs between successive layers of cable being wound on the drum, means providing a continuous winding groove on the outer periphery of said core between said flanges, portions of said groove being parallel to said flanges, and portions of said groove being at an angle to said flanges.

7. In a cable winding apparatus comprising a drum having an essentially cylindrical core with flanges at the opposite ends thereof, tapered end fillers at the opposite ends of the drum core to initiate the cross-overs between successive layers of cable being wound on the drum, grooved bar means encircling the core between the flanges providing a continuous winding groove, portions of said bar means being disposed parallel to the drum flanges, and portions of said bar means being disposed at an angle to the drum flanges.

8. In a cable winding apparatus comprising a drum having an essentially cylindrical core with flanges at the opposite ends thereof, tapered end fillers at the opposite ends of the drum core to initiate the cross-overs between successive layers of cable being wound on the drum, a continuous groove in the outer periphery of the core encircling the core a plurality of times, the greater portion of each turn of said groove around the core being parallel to the drum flanges, and the remainder of each turn being disposed at an angle to the drum flanges.

FRANKLYN L. LE BUS.

REFERENCES CITED

The following references are of record in the file of this patent:

UNITED STATES PATENTS

| Number | Name | Date |
|---|---|---|
| 110,980 | Lawton | Jan. 17, 1871 |
| 480,158 | Wardwell, Jr. | Aug. 2, 1892 |
| 2,204,938 | Le Bus | June 18, 1940 |
| 2,216,819 | Le Bus | Oct. 8, 1940 |